United States Patent [19]

Roberts

[11] Patent Number: 4,765,479

[45] Date of Patent: Aug. 23, 1988

[54] STRAPPING CORNER SUPPORT

[76] Inventor: John T. Roberts, 3088 Mountain View Rd., Clover, S.C. 29710

[21] Appl. No.: 923,340

[22] Filed: Oct. 27, 1986

[51] Int. Cl.⁴ .............................................. B65D 6/36
[52] U.S. Cl. ..................................... 206/453; 217/69
[58] Field of Search ............................ 206/453, 586; 217/69-71, 66

[56] References Cited

U.S. PATENT DOCUMENTS

| 749,834 | 1/1904 | Beisel | 217/69 |
| 969,950 | 9/1910 | Griesbeck | 217/69 |
| 1,041,413 | 10/1912 | Betham | 217/69 |
| 1,063,628 | 6/1913 | Ware | 217/69 |
| 1,624,531 | 4/1927 | Cary | 217/69 |
| 3,073,439 | 1/1963 | Symmonds, Jr. | 206/453 |
| 3,152,693 | 10/1964 | Anderson | 206/453 |
| 3,482,759 | 12/1969 | Ortiz | 206/453 X |

Primary Examiner—William Price
Attorney, Agent, or Firm—Bailey & Hardaway

[57] ABSTRACT

An initially planar thermoplastic article which may be folded about a score line to form a corner support for use in conjunction with strapping material on packages to prevent damage thereto.

1 Claim, 2 Drawing Sheets 4,765,479

STRAPPING CORNER SUPPORT

BACKGROUND OF THE INVENTION

This invention relates to the art of packaging and bundling, and more particularly to a novel corner protector which serves to prevent damage to the corners of packages bound with strapping material.

The need for such protection has long been recognized in the packaging art, and various items have been developed to distribute the force of the strapping material as it crosses the edges of the package.

One such device is described in U.S. Pat. No. 3,073,439 to Symmonds, wherein a plastic L-shaped corner protector has a raised support surface for accommodating a tensioned strap. The device is further characterized by the provision of adhesive means whereby it may be secured in a pre-selected position on the corner of a bundle or package.

Another such device is described in U.S. Pat. No. 3,416,652 to Almasy, wherein a metal corner clip has a cushioned cardboard liner adhered thereto, and which may be formed in a continuous length and cut to obtain individual clips.

SUMMARY OF THE INVENTION

It is thus an object of this invention to provide a novel device which serves to prevent damage to the corners of packages bound with strapping materials.

It is a further object of this invention to provide a corner support device which may be placed directly onto the strapping material used in conjunction therewith.

It is still a further and more particular object of this invention to provide such a device of thermoplastic material which may be fusion bonded with other like devices for dispensing purposes.

These as well as other objects are accomplished by an initially planar thermoplastic article scored along its lateral midline and which can be folded thereabout to form a generally L-shaped strapping corner support. The corner support disclosed herein comprises an improvement in the art of packaging and bundling as it is initially planar in form, thereby providing ease and economy of production, shipping, and storage. A further improvement is that the present invention may be placed directly onto the strapping material used in conjunction therewith, thereby facilitating the packaging process and preventing lateral movement of the strapping material relative to the corner support.

DETAILED DESCRIPTION

In accordance with this invention it has been found that a strap support may be provided which serves to prevent damage to the corners of packages bound with strapping material and which may be formed by folding a plastic article about a score along its lateral midline. The article in accordance with this invention is thus initially planar in form, thereby providing ease and economy of production, shipping, and storage. Additionally, a group of such plastic articles can be arranged in a stacked relationship for seriatim dispensing thereof formed into a cartridge by a fusion bond between individual articles as illustrated in copending U.S. Application Ser. No. 421,859 filed Sept. 23, 1982. Various other advantages and features of the invention will become apparent from the following description given with reference to the various figures of drawing.

Figure 1:
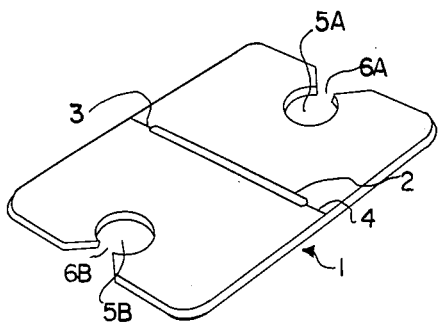
FIG. 1 of the drawings illustrates the thermoplastic article of this invention.

FIG. 1 of the drawings illustrates the thermoplastic article 1 in its initial planar form.

It is seen from FIG. 1 of the drawings that article 1 defines passageways 5A, 5B which are located along the longitudinal axis of article 1. Additionally, it is seen that passageways 5A, 5B communicate with the edge portion of article 1 by means of notches 6A, 6B.

Figure 2:
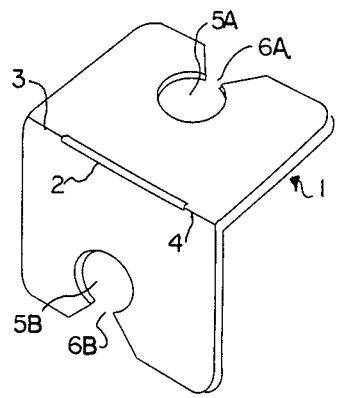
FIG. 2 of the drawings illustrates the thermoplastic article of FIG. 1 formed into a working state.

FIG. 2 of the drawings illustrates the thermoplastic article 1 formed into a functional L-shape by means of folding about score line 2.

It is seen from FIG. 1 of the drawings that score line 2 does not fully traverse the lateral midline of article 1, extending interiorly to leave sections 3 and 4 unscored.

Figure 3:
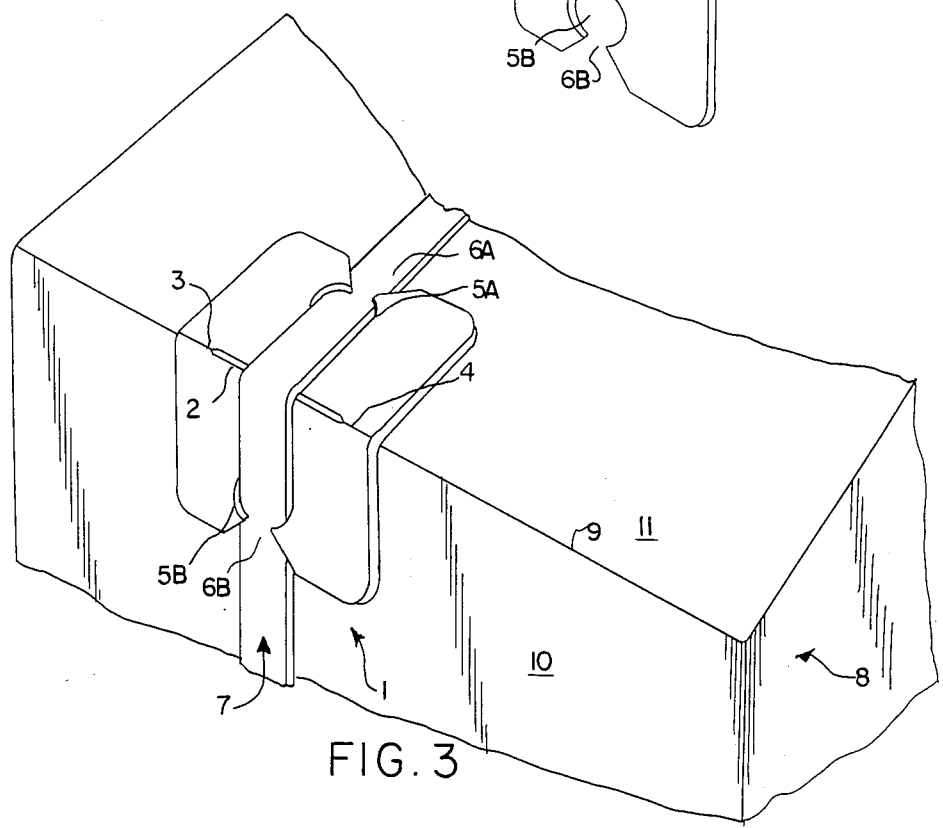
FIG. 3 of the drawings illustrates the thermoplastic article of FIG. 2 in accordance with a preferred embodiment of this invention.

FIG. 3 of the drawings illustrates a preferred embodiment of article 1.

It is seen from FIG. 3 of the drawings that article 1 is folded about score line 2 and placed onto a strapping material 7 by means of passing strapping material 7 through passageways 5A, 5B via notches 6A, 6B. Additionally, it is seen that such a utilization of article 1 in conjunction with package 8 causes the interior angle of article 1 at score line 2 to conform to the interior angle of package 8 at edge 9. Article 1 thus serves to distribute the compressive force of strapping material 7 to side 10, 11 of package 8, thereby preventing damage to edge 9 by strapping material 7. Folding along score line 2 has been found to bring about a particularly sharp and well defined right angle causing the plastic material to become rigid which surprisingly enhances the load carrying ability of the article 1.

Preferably, this invention is formed by stamping the article from a sheet of rigid or semi-rigid thermoplastic material which is capable of being fusion-bonded.

The more prominently useful thermoplastic materials currently utilized for commercial applications include the polyolefins and copolymers of olefins and polyethylene, polypropylene, and copolymers of ethylene and propylene with ethylene vinyl acetate being an extensively utilized material because of the low cost thereof.

Figure 4:
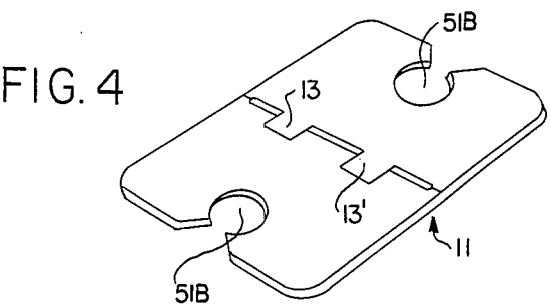
FIGS. 4, 5 and 6 are views similar to FIGS. 1, 2 and 3 respectively showing another embodiment of this invention.
Figure 5:
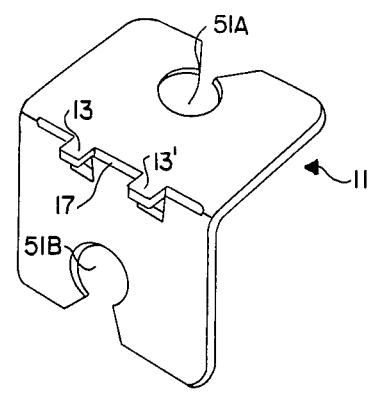
Figure 6:
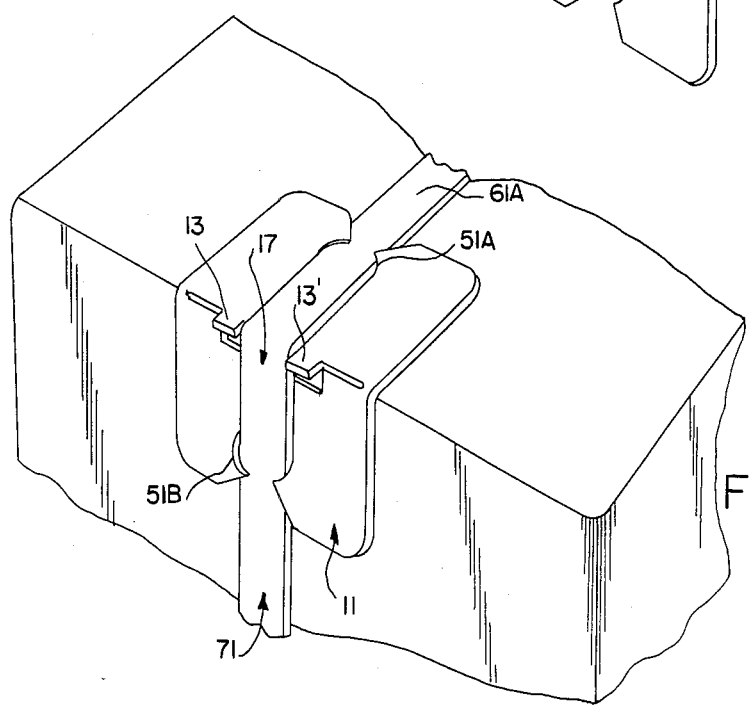

FIGS. 4, 5 and 6 are views similar to FIGS. 1, 2 and 3 illustrating yet another embodiment of this invention. As illustrated in FIG. 4 score 21 may be interrupted by tabs 13 such that when folded as illustrated in FIG. 5 provide a locator slot 17 between tabs 13 and 13'. As best illustrated in FIG. 6 the locator slot 17 is in a position to receive strapping tape 71 such that slot 17 together with or without passageways 51(a) and 51(b) precisely locates strap 71 in the central portion thereof and prevents dislodgement of strap 71.

It is thus apparent that the invention disclosed herein provides an initially planar thermoplastic article which may be folded about a score line to form a generally L-shaped device which serves to prevent damage to the corners of packages bound with strapping material. As many variations will be apparent from a reading of the above description, such variations are embodied within the spirit and scope of this invention as defined by the following appended claims:

What is claimed is:

1. A strapping support comprising:
   a planar sheet of rigid or semirigid plastic material having a longitudinal axis;
   said sheet having a score line extending transversely to said longitudinal axis for folding thereof;
   said score line extending across less than the entire transverse surface of said sheet to define a fold point for the corner support for mating with a corner of an article to be protected by the support;
   said sheet defining tabs in alignment with said score line whereby when said sheet is folded about said score line, said tabs define an alignment slot for receipt of a strap extending in the direction of said longitudinal axis.

* * * * *